T. Pollard,
Elevator.
No. 106,284. Patented Aug. 9, 1870.
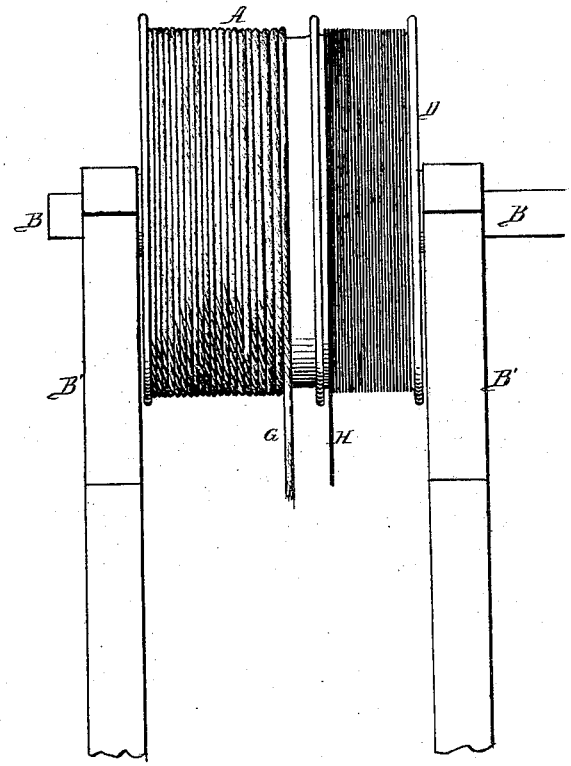
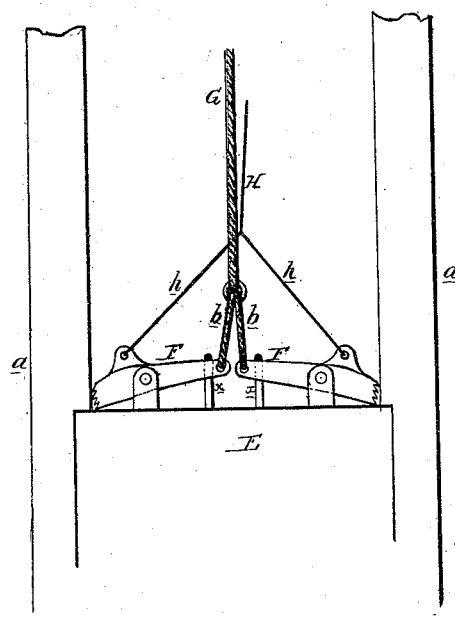
WITNESSES

UNITED STATES PATENT OFFICE.

THOMAS POLLARD, OF PHILADELPHIA, PENNSYLVANIA, ASSIGNOR TO J. V. MERRICK, W. H. MERRICK, AND J. E. COPE, OF SAME PLACE.

IMPROVED HOISTING APPARATUS.

Specification forming part of Letters Patent No. 106,284, dated August 9, 1870.

I, THOMAS POLLARD, of Philadelphia, county of Philadelphia, State of Pennsylvania, have invented an Improvement in Hoisting Apparatus, of which the following is a specification:

Nature and Object of the Invention.

My invention relates to an improvement in, or rather a modification of, the hoisting apparatus for which Letters Patent were granted to J. V. and W. H. Merrick on the 9th day of June, 1868; and consists in combining, with a hoisting cage or platform, its rope, and drum, a rope moving in unison with the hoisting-rope, and connected to arresting cams, levers, or their equivalents, all substantially as described hereafter, so that when the hoisting-rope breaks, the supplementary rope will be the medium of bringing the arresting mechanism of the cage into action, and of thereby arresting the said cage.

My invention is especially applicable to hoisting apparatus for deep mines, where the weight employed for arresting the cage, as described in the patent of the said J. V. and W. H. Merrick, would be inconvenient.

Description of the Accompanying Drawing.

The figure in the accompanying drawing represents sufficient of a hoisting apparatus to illustrate my invention.

General Description.

A is the hoisting-drum, secured to the driving-shaft B, which is arranged to revolve in suitable bearings on appropriate standards or frames B'. D is another drum, of the same diameter as and revolving with, and, if desired, forming a part of, the drum A.

E represents part of a hoisting-cage of a mine, for instance, and is arranged to slide in suitable guides $a\ a$. This cage is provided with safety apparatus, in the present instance similar to that described in the patent granted to J. V. and W. H. Merrick on the 9th day of June, 1868, the mechanism consisting of two levers, F F, the long arms of which are connected by ropes or chains $b\ b$ of the hoisting-rope G, the latter being secured to and coiled around the drum A.

The thort arms of the levers have serrated cam-like terminations, connected by cords or chains $h\ h$ to a rope, H, which is lighter than the hoisting-rope, and which is secured to and coiled round the smaller drum D.

In raising and lowering the cage the two ropes will move in unison, and the long arms of the levers F F will remain elevated, and in contact with the stops $x\ x$ on the cage, while the short cam-like arms of the levers will be free from frictional contact with the guides $a\ a$. Should the hoisting-rope break, however, its control of the levers will cease, and they will be under the control of the rope H, which, on the first attempt of the cage to fall, will be tightened, the short cam-like arms of the levers will be brought into instant contact with the guides, and the cage will be consequently arrested.

I have stated above that my invention relates to an improvement in the safety hoisting apparatus for which Letters Patent were granted to J. V. and W. H. Merrick on the 9th day of June, 1868; but my invention may be looked upon in the light of a modification of the invention of the said Merricks, for in the latter there is combined with the hoisting-cage a weight arranged to move in a contrary direction to the cage, the said weight being attached to arresting cams, levers, or their equivalents, the weight being the medium for arresting the cage should the hoisting-rope break. This weight would be a very inconvenient adjunct in deep mines; hence I have adopted a supplementary pulley, around which the rope H can be coiled as fast as and uniform with the winding of the hoisting-rope around the larger pulley A, the said rope serving to arrest the cage, in the manner described, when the hoisting-rope breaks.

I do not desire to confine myself to the specific arresting levers described as connected to the cage, inasmuch as many of the devices heretofore proposed as mediums for stopping a cage when the hoisting-rope breaks may be adopted without departing from the main features of my invention.

Claim.

The combination, with a hoisting-cage, its rope, and drum, of a supplementary drum, holding a rope moving in unison with the hoisting-rope, and connected to arresting cams, levers, or their equivalents, all substantially as set forth.

In testimony whereof I have signed my name to this specification in the presence of two subscribing witnesses.

THOS. POLLARD.

Witnesses:
F. A. DEVITT,
WILLIAM I. HOYT.